R. V. WALLACE.
TRACTOR.
APPLICATION FILED JULY 6, 1915.
1,175,096.
Patented Mar. 14, 1916.
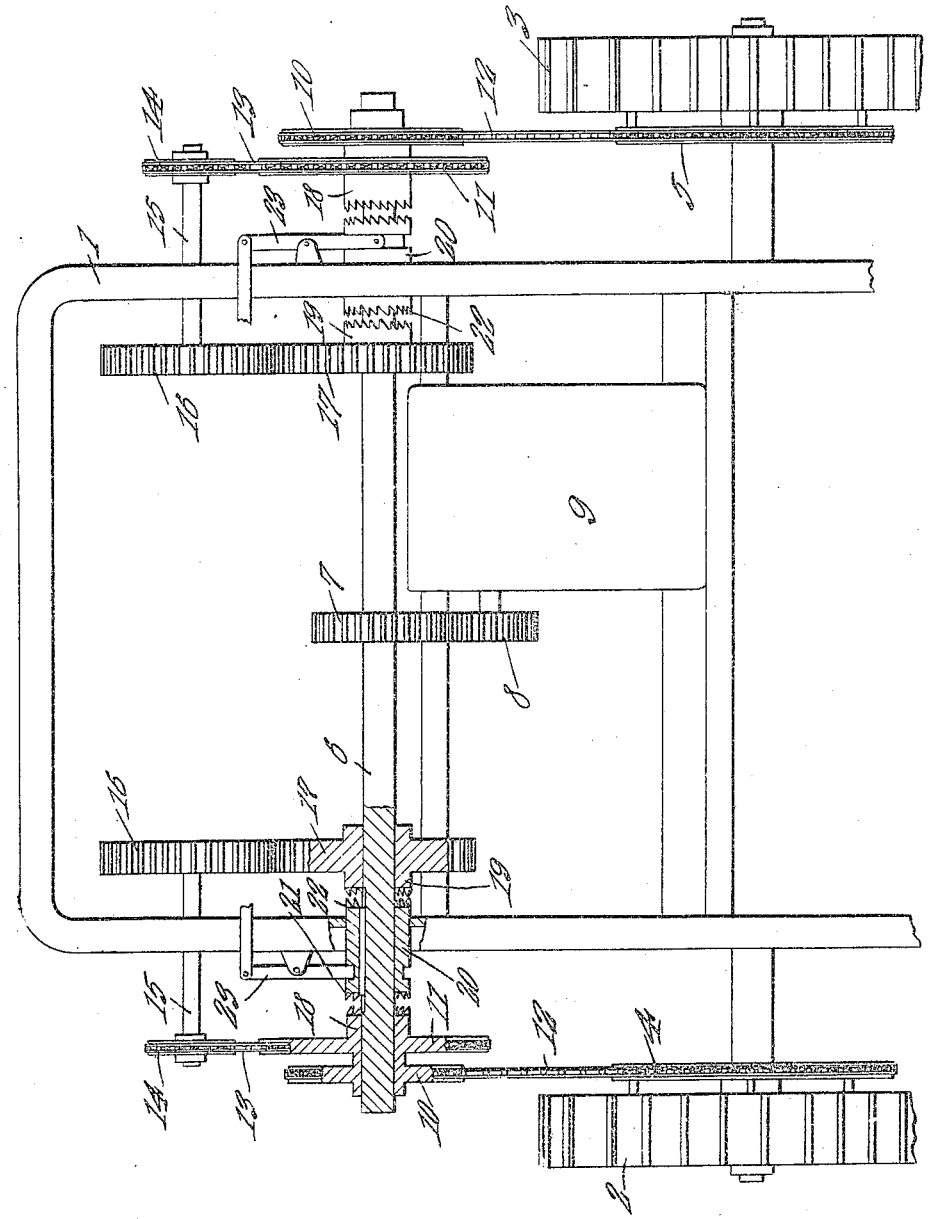
Witnesses
R. V. Wallace,
Inventor
Attorneys

UNITED STATES PATENT OFFICE.

ROBERT V. WALLACE, OF CHENEY, WASHINGTON.

TRACTOR.

1,175,096.    Specification of Letters Patent.    Patented Mar. 14, 1916.

Application filed July 6, 1915. Serial No. 38,231.

*To all whom it may concern:*

Be it known that I, ROBERT V. WALLACE, a citizen of the United States, residing at Cheney, in the county of Spokane and State of Washington, have invented a new and useful Tractor, of which the following is a specification.

This invention relates to tractors and more particularly to combined propelling and steering mechanism for use in connection therewith.

In some portions of the United States, particularly in the northwestern portion, where farming is conducted on a large scale in hilly countries, it has been practically impossible, heretofore, to use tractors for the purpose of drawing agricultural machines, as such abrupt turns have been necessary in order to convey the machine over all portions of the ground, that ordinary tractors have not been able to meet the requirements.

One of the objects of the present invention is to provide a tractor having separate mechanisms for transmitting motion from a main drive shaft to the respective drive wheels, these propelling mechanisms operating to drive the wheels of the tractor either forwardly or rearwardly together or independently, the mechanism employed being simple, compact and efficient. It is also possible by means of the drive mechanism to leave either or both of the wheels stationary during the rotation of the drive shaft and to rotate one of the wheels in either direction while the other wheel is stationary or while the other wheel is rotating in the opposite direction. Thus it becomes possible to make an abrupt turn of the machine while moving either forwardly or rearwardly, thereby adapting it especially for use upon hilly country such as mentioned heretofore.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing, which is a view partly in plan and partly in section of a portion of a tractor, the preferred form of the invention has been shown.

Referring to the drawing by characters of reference 1 designates a portion of the frame or chassis of the tractor and 2 and 3 designate the drive wheels. Secured to these drive wheels so as to rotate therewith are sprockets 4 and 5 respectively. Journaled on and extending transversely of the frame 1 is the main drive shaft 6 of the mechanism, this drive shaft being operated in any suitable manner, as by means of gears 7 and 8 driven by a motor 9. Two drive units are mounted on the shaft 6 and each of these units includes connected sprockets 10 and 11 mounted loosely on the shaft 6. Sprocket 10 is adapted to transmit motion through a chain 12 to the adjacent sprocket 4 or 5, while sprocket 11 receives motion through a chain 13 from a sprocket 14 fixedly secured to a counter shaft 15. This counter shaft is journaled on the frame 1 in any suitable manner and has a gear 16 secured to it. Said gear constantly meshes with a gear 17 loosely mounted on the shaft 6 and forming a part of the unit to which the sprockets 10 and 11 belong. Sprocket 11 has a clutch member 18 extending inwardly therefrom and another clutch member 19 extends inwardly from the gear 17. Feathered on shaft 6 and between the two clutch members 18 and 19 is a shiftable clutch member 20 having toothed ends 21 and 22 respectively. This clutch member 20 may be operated in any suitable manner, a portion of the actuating mechanism being shown generally at 23.

It will be understood of course that when the clutch members 20 are in their intermediate positions, shaft 6 can rotate without motion being transmitted therefrom to the gears or sprockets and, consequently, wheels 2 and 3 will remain stationary. Should it be desired to drive the tractor forwardly, it would merely be necessary to couple the clutch members 18 to the member 20 so that a direct drive from shaft 6 through sprocket 10 and chain 12 to the sprockets on the wheels 2 and 3 would thus result. While the machine is thus being propelled it can be abruptly turned by uncoupling one of the sprockets from the clutch member 20 while the sprockets of the other drive unit remain coupled to the shaft 6. Obviously, therefore, one of the wheels of the tractor will remain stationary while the opposite wheel will be driven forwardly. This of course will result in a quick turn of the tractor. An even quicker turn can be effected by leaving one of the clutch members 20 in engagement with the adjacent clutch member 18 and then shifting the other clutch member 20 into engagement with the clutch member 19 adjacent thereto. This will result in the forward rotation of one of the wheels of the tractor while the other wheel will be rotated in the opposite direction by reason of the fact that gear 17 will be coupled to shaft 6 and motion will be transmitted therefrom through gear 16, shaft 15, sprocket 14, chain 13 and sprocket 11 to sprocket 10. By throwing both clutch members 20 into engagement with the adjacent clutch members 19, the tractor can be driven rearwardly and while thus being moved, it can be steered in the same manner as when driven forwardly.

It will be seen that the entire mechanism is very simple, durable and compact and can be readily controlled.

What is claimed is:—

In a tractor, the combination with drive wheels, of a drive shaft, means for rotating the drive shaft continuously in one direction, and a separate drive unit provided for each of the wheels of the tractor, each unit including a sprocket upon the wheel of the tractor, connected sprockets loosely mounted upon the drive shaft, a chain connection between one of the connected sprockets and the sprocket on the adjacent wheel of the tractor, a gear loosely mounted on the drive shaft, a clutch member feathered on the shaft and between the gear and sprockets, a counter shaft, a sprocket thereon, a chain connection between said sprocket and one of the connected sprockets on the drive shaft, a gear upon the counter shaft and constantly meshing with the loose gear on the drive shaft, and means for shifting the clutch member to couple the drive shaft to either the gear or the sprocket thereon, the two clutch members on the drive shaft being shiftable independently.

In testimony that I claim the foregoing as my own, I have hereto affixed my signature in the presence of two witnesses.

ROBERT V. WALLACE.

Witnesses:
 COY C. DAMRELL,
 J. E. WHALEN.